United States Patent [19]
Gaytan et al.

[11] Patent Number: 5,664,116
[45] Date of Patent: Sep. 2, 1997

[54] BUFFERING OF DATA FOR TRANSMISSION IN A COMPUTER COMMUNICATION SYSTEM INTERFACE

[75] Inventors: Andre J. Gaytan, Union City; Rasoul M. Oskouy, Fremont, both of Calif.

[73] Assignee: Sun Microsystems, Inc., Mountain View, Calif.

[21] Appl. No.: 499,383

[22] Filed: Jul. 7, 1995

[51] Int. Cl.$^6$ .................................................. G06F 13/00
[52] U.S. Cl. ........................ 395/200.64; 395/284
[58] Field of Search ............................ 395/250, 284, 395/200.02

[56] References Cited

U.S. PATENT DOCUMENTS 5,274,768 12/1993 Traw et al. ..................... 395/200.2
5,471,586 11/1995 Sefidvash et al. ............... 395/284

*Primary Examiner*—Krisna Lim
*Attorney, Agent, or Firm*—Blakely Sokoloff Taylor & Zafman

[57] ABSTRACT

A transmission data buffer and method for buffering data to be transmitted from a host computer to an asynchronous transfer mode (ATM) telecommunications network. The transmission data buffer comprises a plurality if FIFO memories, one for each channel which is established on the connection to the ATM network. A load engine loads packets of data (e.g. AAL5, AAL5-MPEG, TCP packets) into particular FIFO memories in the transmission buffer according to a load schedule queue. The data is removed from the FIFO memories by an unload engine according to entries in a bandwidth group table. The unload engine segments the data as it is removed from the FIFOs, by removing one ATM cell payload (48-bytes) at a time, and adds the ATM cell header data. The unload engine can also generate AAL5 packet CRC fields and add a control and length field to the cell data segmented from an AAL5 packet. The transmission buffer memory includes at least one tag bit for each data word which is set to indicate the beginning and end of packets in the FIFO memories.

26 Claims, 7 Drawing Sheets

FIG. 7

BUFFERING OF DATA FOR TRANSMISSION IN A COMPUTER COMMUNICATION SYSTEM INTERFACE

BACKGROUND OF THE INVENTION

This invention relates to data buffering in an interface between a computer system and a communication system, for the transmission of data from the computer system by way of the communication system. In particular, the invention relates to a transmission data buffering system for coupling a computer system for communication through a digital cell based telecommunication network.

With the increasing use of digital telecommunications such as Integrated Services Digital Networks (ISDN) and Asynchronous Transfer Mode (ATM) systems able to provide digital communications over long distances, it is advantageous to equip computer systems with the ability to exploit such communication capabilities. In order to do this, a telecommunications interface can be coupled to the computer system bus and telecommunications line to perform communication specific tasks related to transmitting and receiving data by way of the telecommunications line.

The telecommunications interface is utilized to create a network of computers which communicate through the telecommunications media. A traditional network interface circuit which is employed to communicate between computers in a local area network (LAN), such as an Ethernet (TM) or token ring network, is insufficient, however, for the purposes networking across ATM telecommunications media.

A host computer from which data is to be transmitted may typically operate under an established data transfer protocol, such as the Transmission Control Protocol (TCP) in which data to be transferred is arranged in packets of up to several kilobytes. On the other hand, the telecommunications network, such as an ATM network, through which the data is transferred, typically operates under a different protocol. For example, an ATM network switch operates on 53 byte cells, each containing a 48 byte data payload. Thus, the telecommunications interface must provide for translation between the different protocol requirements.

Further, an ATM connection is able to carry a plurality of separate channels, sometimes referred to as virtual channels or VCs, to separate destinations in the telecommunications media. In one form of the ATM protocol, up to 1024 individual channels can be supported by a single physical connection to the ATM network. The host computer can therefore maintain separate channels of communications to a multiplicity of other computers coupled to the ATM media at different locations. Each channel may have different data communication characteristics or requirements, such as bandwidth, bit error rate and the like.

In a computer networking interface, buffering of data is an important function, both for data from the host computer for transmission to another node of the network, and for data received from a remote network node destined for the host computer. In a traditional network interface circuit, such as an 82596CA LAN coprocessor from Intel Corporation of Sunnyvale, Calif., buffering of transmission data is primarily in the host computer memory which is shared with the network interface. The data for transmission is arranged in the shared memory by the host processor, and is then extracted by a DMA controller of the network interface and stored temporarily in a transmit FIFO which feeds the data to the serial transmission machine.

However, this form of buffering for transmission data is insufficient for a network interface which couples to an ATM telecommunications media, for example. The transmission buffering system for an ATM interface should allow for data movement from the host computer memory without concern or compromises for the ATM media. The buffer system should also allow optimal data movement to the ATM network in a way that is designed for and only concerned with the ATM characteristics. In this way, the transmission buffering system can isolate the needs and concerns of the host memory system from those of the ATM network.

As mentioned above, a large number of channel connections through the ATM media to the network interface may be in existence at one time, with the host computer wishing to transmit different data, at different rates, and with different transmission characteristics, on each channel. As a result, the traditional data buffering systems for network interfaces is inadequate for optimum efficiency and isolation of operation in a host computer and ATM media interface. For example, the host memory system will operate most efficiently if data is read from sequential addresses, but transmission on the multiple channel ATM network connection will require that be transmitted data be interleaved from areas of the host memory that are not sequentially addressed. The above mentioned LAN coprocessor provides for the chaining or linking together of non-sequentially addressed buffer areas in the host memory, but this would nevertheless create an unnecessary burden on the host memory system in a ATM interface where the addressed buffer is likely to change from one cell (53 bytes) to the next.

Buffering of the transmission data in the network interface is also advantageous where a large amount of data from the same source is to be transmitted, since the host memory system may be busy at times with other tasks, such as writing to display memory or reading from a hard disk. The single transmit FIFO does not help appreciably in this situation because it is too small to provided much buffering being, in the case of the 82596CA LAN coprocessor, only 64 bytes in size. In a related aspect, it is desirable in some applications to be able to buffer an entire TCP packet in the network interface before transmission of that packet commences. For example, a TCP packet includes a 16 bit checksum in the header field at the beginning of the packet, which is a one's complement sum of the entire packet of data. Therefore, if the generation of the checksum is to be performed by a circuit in the network interface rather than by software in the host computer, the network interface requires the entire packet before the checksum can be completed. Furthermore, because the checksum is included in the header of the TCP packet, transmission of the packet cannot commence until the checksum has been calculated and stuffed in the packet header.

SUMMARY OF THE INVENTION

In order to overcome these difficulties in applying traditional transmission data buffering to a computer system ATM interface, the present invention provides a transmission data buffering system for buffering data to be transmitted from a host computer by way of an asynchronous transfer mode telecommunications connection comprising a plurality of channels, wherein an individual FIFO buffer is provided for each of the plurality of channels. A load engine is coupled to transfer packets of data from the computer system memory to the individual FIFO buffers according to a load queue. An unload engine retrieves data from the individual FIFO buffers in cell payload amounts, so as to segment the buffered packet data into ATM cell data, according to an unload queue.

In one form of the invention each FIFO buffer is associated with a corresponding data threshold for that buffer.

Each time the unload engine removes data from a particular FIFO buffer, the amount of data remaining in that buffer is determined by the unload engine and compared against the associated data threshold for that buffer. If the data remaining in the buffer does not exceed the data threshold then the unload engine enters the FIFO buffer in the load queue to be serviced by the load engine.

Preferably, each FIFO buffer in the transmission data buffering system is of a memory size able to store an entire packet of data from the host computer. Preferably, also, the unload engine senses the beginning of a TCP data packet in a FIFO buffer and does not begin segmenting the packet until the whole of that packet is stored in the buffer. In this way, TCP checksum generation can be provided as a hardware function in the ATM interface because the whole of the TCP packet will be available in the buffering system for generation of the checksum before segmentation of the packet data takes place, allowing the checksum value to be inserted into the header of the TCP packet before transmission thereof. Accordingly, each FIFO buffer is preferably defined by three pointers, including a packet beginning pointer, as well as a write pointer and a read pointer ordinarily associated with a FIFO. The packet beginning pointer can then be utilized, together with an offset value, to determine the location in the FIFO buffer in which to stuff the checksum value.

The memory which comprises the buffer FIFOs is preferably synchronous static RAM (SSRAM) of the type ordinarily employed as cache memory for microprocessors. A characteristic of the cache SSRAM is that it is accessible in groups of four locations at a time, such that the unload engine need only perform twelve of 32-bit read cycles in order to retrieve a 48-byte cell payload from a particular FIFO buffer. All of the data for a cell to be transmitted is read from the buffer by the unload engine in consecutive cycles, followed by consecutive write cycles by the load engine (or vice versa), rather than interleaving the read and write cycles during a cell transmission period. This is to avoid potential buffer memory data bus clashes when switching between reading and writing cycles. To ensure that data bus clashes do not occur, preferably a single clock cycle delay is inserted between reading from and writing to the buffer memory.

The buffer memory is preferably also provided with a tag field of at least one bit per four byte word. By setting the at least one tag bit in the FIFO buffers the beginning and end of packets in the FIFO can be marked for the unload engine. In one form of the invention, the buffer system is adapted for ATM Adaption Layer AAL5 format packet data, wherein one tag bit at the start of a packet is used to designate whether or not the packet is in an AAL5 format. Another tag bit may be provided in order more efficiently deal with AAL5 packets which are utilized for transmitting Moving Pictures Experts Group (MPEG) format data, which are relatively short in length, wherein a plurality of MPEG AAL5 packets are concatenated in the FIFO buffer memory with one tag bit designating the MPEG packet boundary and another tag bit designating the end of the concatenated packets.

The invention is described in greater detail herein below, by way of example only, with reference to the accompanying drawings illustrating a preferred embodiment of the invention.

BRIEF DESCRIPTION OF THE DRAWINGS

FIG. 7 illustrates various transmission buffer formats according to an embodiment of the invention.

DETAILED DESCRIPTION OF THE INVENTION

The invention is described in greater detail hereinafter, by way of example only, with reference to a preferred embodiment thereof. In the following description, numerous specific details are set forth such as examples of data arrangements and particular circuit configurations, etc. in order to provide a thorough understanding of the present invention. It will be evident, however, to those skilled in the art that such specific details are not necessarily required in order to practice the invention. In other instances, well known structures, circuits and procedures not relating to the crux of the invention have been omitted or simplified in order to avoid unnecessarily obscuring the invention.

Figure 1:
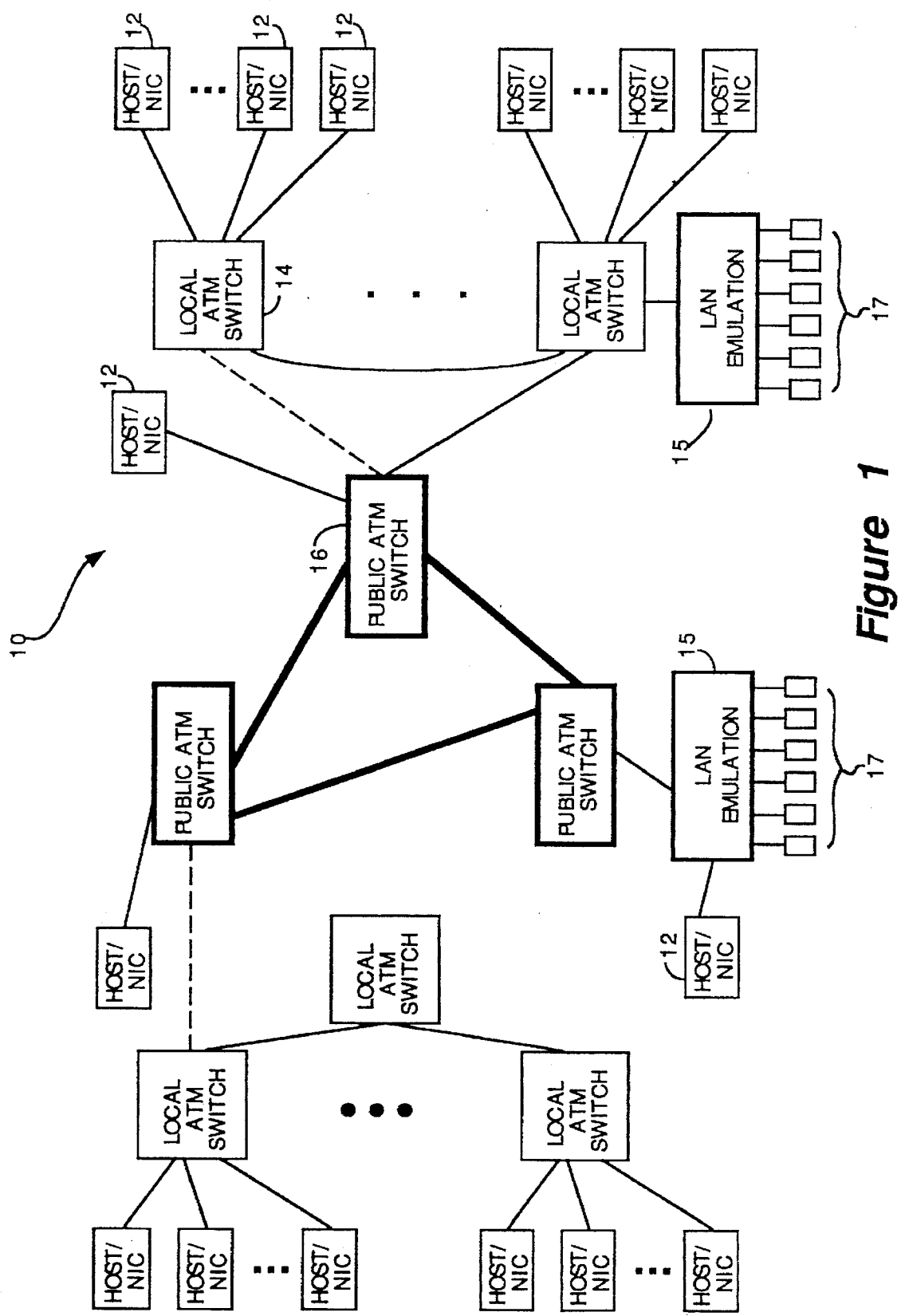
FIG. 1 is a block diagram of a computer network utilizing ATM switching in which the present invention may be implemented.

FIG. 1 illustrates an exemplary computer system network incorporating an asynchronous transfer mode (ATM) network interface circuit (NIC) which can be utilized to implement the present invention. The computer system network 10 includes host computer systems (not shown) which incorporate one or more of the asynchronous transfer mode network interface circuits 12. The NICs 12 are coupled through a local ATM switch 14 to a public ATM switch 16 to enable asynchronous transfer of data between host computer systems coupled to the network 10. Alternately, the NICs 12 can be coupled directly to the public ATM switch 16. As shown in FIG. 1, the computer system network 10 may also include computer systems which incorporate the use of a Local Area Network ("LAN") emulation 15 which serves as a gateway for connecting other networks such as Ethernet or token ring networks 17 which utilize the ATM network as a supporting framework.

Figure 2:
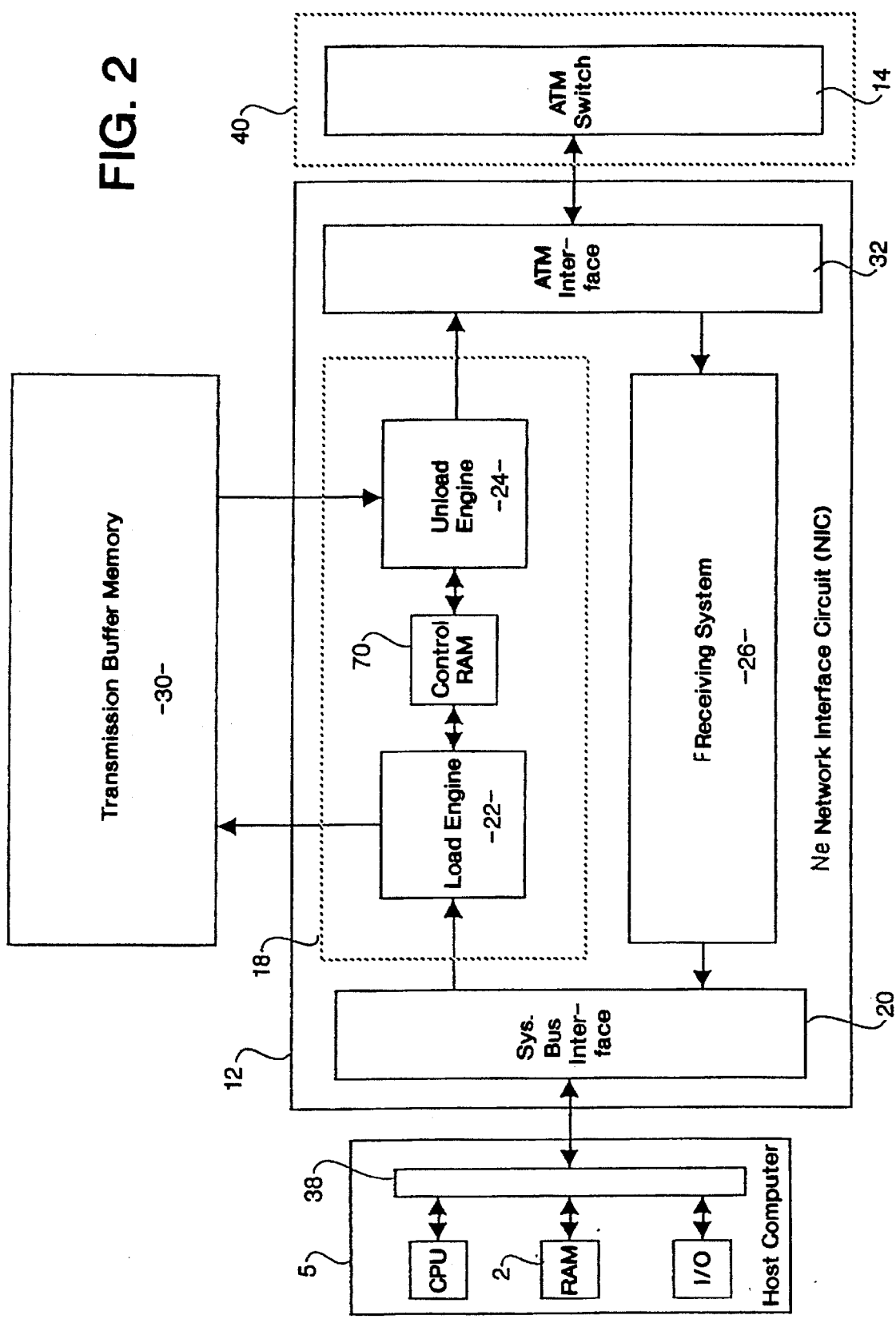
FIG. 2 is a block diagram illustrating buffering for a network interface between a host computer and an ATM switch according to an embodiment of the invention.

FIG. 2 is a simplified system diagram illustrating the architecture of the ATM NIC 12 in accordance with a preferred embodiment of the present invention. The ATM NIC 12 interfaces host computer system 5 coupled through system bus 38 to the network media 40 operating in accordance with the ATM protocol.

The ATM NIC comprises a system bus interface 20 which is coupled to provide communication between the system bus 38 of the host computer and the transmission and receiving portions of the NIC. An ATM media interface 32 is coupled to provide communication between the ATM media 40 and the transmitting and receiving portions. The receiving portion of the NIC 12 is illustrated as block 26, which receives ATM cells from the ATM media 40 by way of the media interface 32 and passes packets of data constructed from the received cells to the host computer 5 by way of the system bus interface 20. Because the present invention is concerned primarily with the buffering of data for transmission on the ATM media, the receiving portion of NIC 12 is not dealt with here in detail.

The transmission portion 18 of the NIC 12 comprises a load engine 22, an unload engine 24, a control RAM 70 and a transmission buffer memory 30 in accordance with an embodiment of the invention. The load engine 22 is coupled to pass data for transmission from the host computer 5 to the transmission buffer memory, by way of the system bus 38 and system bus interface 20. The unload engine 24 retrieves the data from the transmission buffer memory 30 and prepares it for transmission in ATM cells on the media 40 by way of media interface 32. The load engine 22 and unload engine 24 communicate by way of the control RAM 70, which is coupled to both the load and unload engines. As is described in greater detail herein below, the load engine 22 may typically comprises a DMA controller which transfers data from the host computer memory 2, coupled to the system bus 38, to the transmission buffer memory 30. The unload engine comprises a segmentation portion of a segmentation and reassembly (SAR) circuit, to segment the data stored in the transmission buffer memory into small blocks for transmission as ATM cells which include a 48 byte data payload in a 53 byte cell. The reassembly function of the SAR circuit is performed by the receiving system 26.

Together, the network interface elements 20–32 and 70 cooperate to transfer data between the host computer 5 and the other computers in the network through multiple, dynamically allocated channels in multiple bandwidth groups. Collectively, the elements of the network interface circuit 12 function as a multi-channel intelligent direct memory access (DMA) controller coupled to the system bus 38 of the host computer system. In a preferred embodiment, multiple transmit and receive channels are serviced as virtual connections utilizing a full duplex 155/622 Mbps physical link. Multiple packets of data, subscribed to different channels over the system bus 38 to the external buffer memory 30, are segmented by the unload engine 24 into ATM cells for transmission to the ATM media 40 through media interface 32. Preferably the media, and therefore the media interface 32, conforms to the Universal Test and Operations Physical Interface for ATM ("UTOPIA") standard, as described by the ATM User Network Interface Specification. To conform to the UTOPIA specification, the media interface utilizes either a 20 MHz or 40 MHz clock signal in order to support a byte stream at 20 MHz for 155 Mbps or a 16 bit stream at 40 MHz for a 622 Mbps data stream.

In the present embodiment, the unload engine retrieves 48-byte data blocks from the transmission buffer memory, and adds a 4-byte ATM cell header, such that the media interface 32 receives 52-byte data cells each having a 48-byte payload. The media interface 32 inserts a checksum as a fifth byte to the cell header into each cell prior to providing the 53-byte data cell to the media 40. Conversely, when the media interface 32 receives cells from the media 40, it examines the checksum in the fifth byte of each cell to determine if the checksum is correct. If so, the byte representing the checksum is stripped from the cell and the cell is forwarded to the receiving system 26. Otherwise, the entire cell is dropped.

The network interface circuit 12 also shields the cell delineation details of asynchronous transfer from the applications running on the host computer system. For present purposes, it is assumed that applications running on the host computer system manage transmit and receive data using wrap around transmit and receive rings with packet interfaces. However, the present invention may be practiced with the applications running on the host computer system managing transmit and receive data using other data structures.

The system bus interface 20 insulates the host computer system from the specifics of the transfer to the media 40. Furthermore, the transmit and receive portions 18, 26 of the network interface circuit 12 are insulated from the specifics of the system bus 38 and host data structure. In the present preferred embodiment, the system bus is an S-Bus, as specified in the Institute of Electronics and Electrical Engineers ("IEEE") standard 1196 specification. The system bus interface 20 is configured to communicate in accordance with the specifications of the system bus, in the present illustration, the S-Bus. It is contemplated that the system bus interface 20 can be configured to conform to different host computer system busses.

Figure 3:
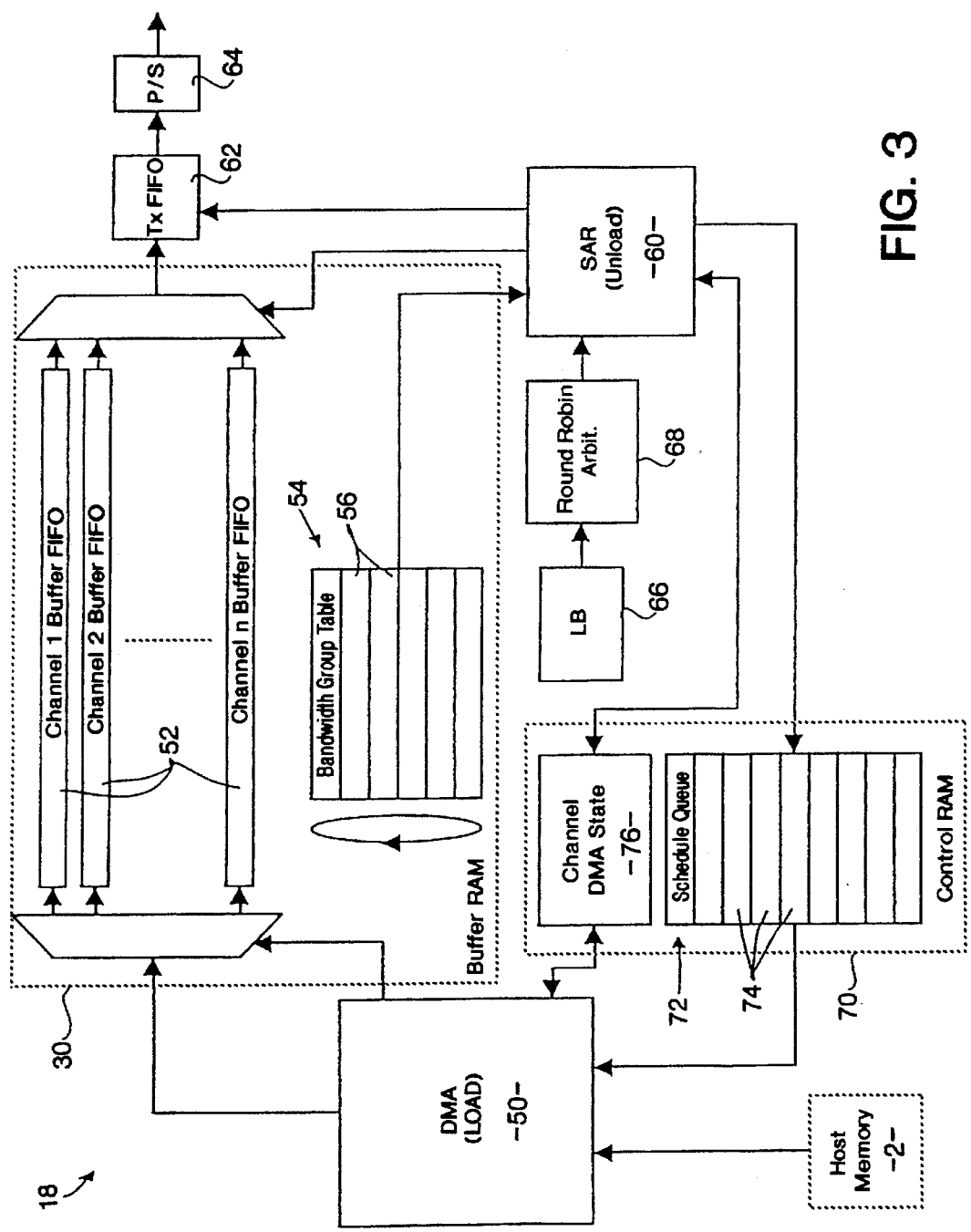
FIG. 3 is a functional block diagram of the transmission portion of a network interface circuit in accordance with the preferred embodiment of the present invention.

Referring to FIG. 3, there is shown a functional block diagram of the transmission portion 18 and transmission buffer memory 30 of the network interface in accordance with a preferred embodiment of the invention. A DMA controller 50 of the load engine 22 (FIG. 2) is coupled to receive data from the host computer memory 2. The DMA controller is also coupled to a schedule queue 72 and channel DMA state memory 76 held in control RAM storage 70, which control the source and destination of data loaded by the DMA controller 50. The transmission buffer memory 30 comprises a plurality of channel buffer FIFOs 52, one for each channel established to the NIC through the ATM media. The channel buffer FIFOs 52 receive packet data from the DMA controller 50, and output cell data to a Tx FIFO 62 under control of the segmentation controller SAR 60. The segmentation controller SAR 60 is also coupled to retrieve DMA state data from the channel DMA state memory 76 in the control RAM 70, and update the DMA state data when required. The Tx FIFO forms a pipeline buffer for cell data which is passed to a parallel to serial converter 64, and thence to the ATM media interface 32 (FIG. 2). The Tx FIFO is also coupled to the unload engine to receive ATM header and CRC data for cell payloads retrieved from the FIFO buffers 52. The SAR is controlled by a bandwidth group table (BWG) 54, and by a leaky bucket mechanism 66 by way of a round robin arbiter 68. The schedule queue 72 is loaded by the SAR 60 according to how empty the individual channel buffer FIFOs 52 are.

The basic operation of the elements illustrated in FIG. 3 is as follows. The transmission buffer memory is arranged into multiple of FIFO buffers (52), corresponding to the multiple virtual channels established from the host computer to different destinations in the ATM network. The buffer memory also includes a bandwidth group table (54) which contains a list of entries which correspond to ATM channels, and thus to FIFO buffers (52). At each cell transmission cycle the SAR examines the next entry in the BWG table and retrieves a 48-byte data cell payload from the FIFO buffer 52 which corresponds to the BWG table entry. The SAR also accesses the channel DMA state memory in the control RAM according to the entry in the BWG table, and retrieves the DMA state data corresponding to the channel being serviced. The 48-byte cell data is pushed into the Tx FIFO 62, together with a 4-byte ATM header from the DMA state data. The 52-byte cell is then passed to the media interface (FIG. 2) where a final byte of header information comprising a cell checksum (HEC) is added to create the 53-byte cell for transmission on the ATM network.

If the entry in the BWG table is a zero or null entry, this indicates that none of the ATM channels which have been designated constant bit rate (CBR) channels require service in that transmission cycle, and the SAR then turns to the channels designated as variable bit rate (VBR) or unspecified bit rate (UBR). The transmission cells on the VBR and UBR channels is regulated by a leaky bucket (LB) mechanism 66, as described in the aforementioned ATM User Network Interface Specification document. Each VBR/UBR channel is associated with a LB which is defined by a number of parameters supplied by the host computer for the channels, namely a Peak rate, a Sustain rate, and Maximum burst size while segmenting at peak rate. The LB parameters specify a priority for the channel with which it is associated, which is utilized by the SAR to determine which FIFO buffer to draw the next cell data payload from. For channels with the same LB priority, a round-robin arbitration scheme is employed by the arbiter 68. If the BWG table contains a null entry and there is no VBR/UBR data to transmit, then the transmission cycle is considered null and no cell data is pushed into the Tx FIFO within this transmission cycle (cell boundary).

Each time the SAR retrieves a cell data payload from a particular channel FIFO buffer, that FIFO is examined to determine how much packet data remains in the FIFO buffer. This amount of data remaining in the FIFO buffer is compared against a threshold for that FIFO which is contained in the control RAM together with the pointers defining the particular FIFO buffer 52 in the transmission buffer memory 30. If the amount of data remaining in the FIFO buffer is less than the threshold, an entry corresponding to that channel is made in the schedule queue 74. The DMA controller 50 examines the schedule queue each loading cycle (a portion of a transmission cycle), and determines which channel FIFO is next in need of packet data to be loaded. The DMA controller first loads the DMA state corresponding to the channel FIFO to be serviced from the channel DMA state memory 76, which contains the DMA state from when each channel was last serviced. Packet data is then transferred from host memory to the FIFO buffer specified by the schedule queue, using a system of data descriptor and completion rings. The packet data is transferred to the FIFO buffer in bursts of 64 bytes. When the FIFO buffer is full, DMA state data for that FIFO is again stored in the channel DMA state memory 76.

Figure 4:
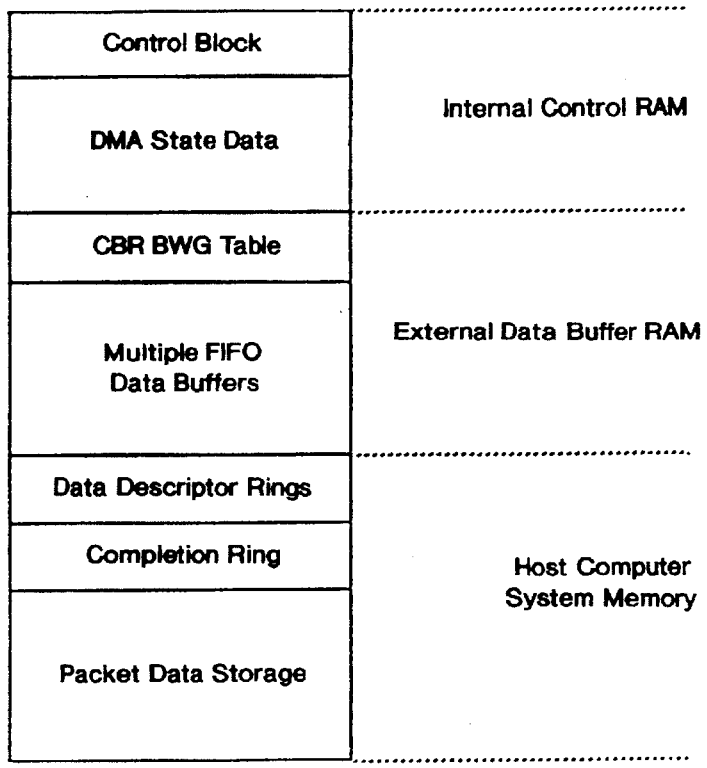
FIG. 4 is a memory map for the network interface circuit of FIG. 3.

FIG. 4 is an overall memory map for the network interface, which shows three memory sub-systems: host computer system memory; external data buffer memory; and internal control RAM. The host computer system memory is RAM which is addressable on the host computer system bus, and so is accessible to both the host computer and the DMA controller of the NIC. The host computer memory is used to store packet data generated, for example, by software operating on the host computer processor(s), before the packet data is passed to the NIC. The host computer memory also stores data structures for the NIC to access the packet data stored in the host memory, comprising a plurality of data descriptor rings and a completion ring.

Referring again to FIG. 2, in the preferred embodiment the NIC 12 comprising the interfaces 20, 32 and the transmitting and receiving portions 18, 26 is constructed on a single integrated circuit. However, the buffer memory 30 is not constructed in the same integrated circuit as the transmitting and receiving circuitry, and is therefore sometimes referred to as 'external' buffer memory. The control RAM 70 (FIG. 3), on the other hand, is fabricated together with the load and unload engines 22,24 of the NIC, and is sometimes referred to as 'internal' RAM.

As shown in the memory map of FIG. 4, the host computer memory (2) contains a store of packet data which is arranged in buffers which may be chained together. The buffers in host memory are referenced by data descriptor rings which are also held in the host memory, together with a completion ring. The external data buffer RAM (30) contains the plurality of FIFO buffers (52), along with the bandwidth group table (BWG 54). The internal control RAM for the NIC comprises a control or initialization block and DMA state data storage.

Figure 5:
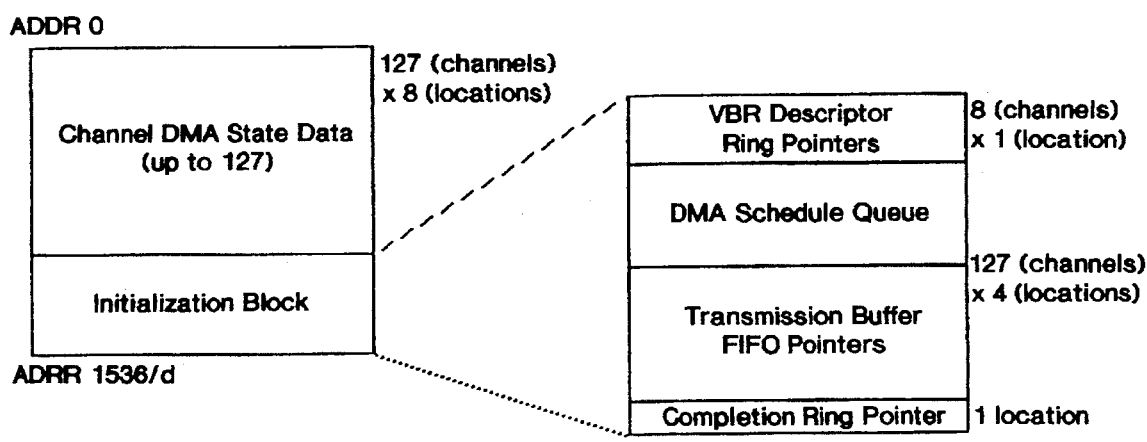
FIG. 5 is a memory map of the internal control RAM shown in FIG. 4.

The internal control RAM (FIG. 5) contains a memory block containing channel DMA state data corresponding to each (up to 127) channel or FIFO buffer. The DMA state data for each channel comprises eight 32-bit words which are programmable by the host computer software to control ATM and system specific parameters for each of the communication channels. The DMA state data for a particular channel comprises:

current buffer information relating to the buffer memory region in host computer memory from which data is retrieved by the load engine, including the buffer size, the current position pointer, and whether a plurality of buffer regions in host memory are chained together.

TCP information for channels that transmit TCP packet data. This includes a partial TCP checksum as the checksum for the packet is generated on the fly during loading of the data into the respective FIFO buffer, and a checksum stuffing offset pointer to indicate where in the packet the completed TCP checksum should be stuffed relative to the start of the packet.

An ATM header word and AAL5 control and length data retrieved from the Tx descriptor. The ATM header word is retrieved from the internal control RAM by the unload engine and written into the Tx FIFO (62) at the beginning of each cell for packet data transmitted from the corresponding FIFO buffer. (52). The AAL5 control and length data, as well as an AAL5 CRC word which is calculated on the fly and stored in the DMA state data, is inserted by the unload engine into the last cell of the packet transmitted from the corresponding channel.

The initialization memory block in the control RAM (FIG. 5) contains pointers to the (up to 8) VBR data descriptor rings, and a pointer to the transmission completion ring, in host memory. The DMA schedule queue is also contained in this memory block, which contains a list of channels scheduled for data loading, and pointers to the corresponding CBR data descriptor rings in host memory. Additionally, the control RAM initialization block contains a reference of transmission buffer FIFO pointers defining the FIFO buffers 52 in the transmission buffer memory 30.

Figure 6:
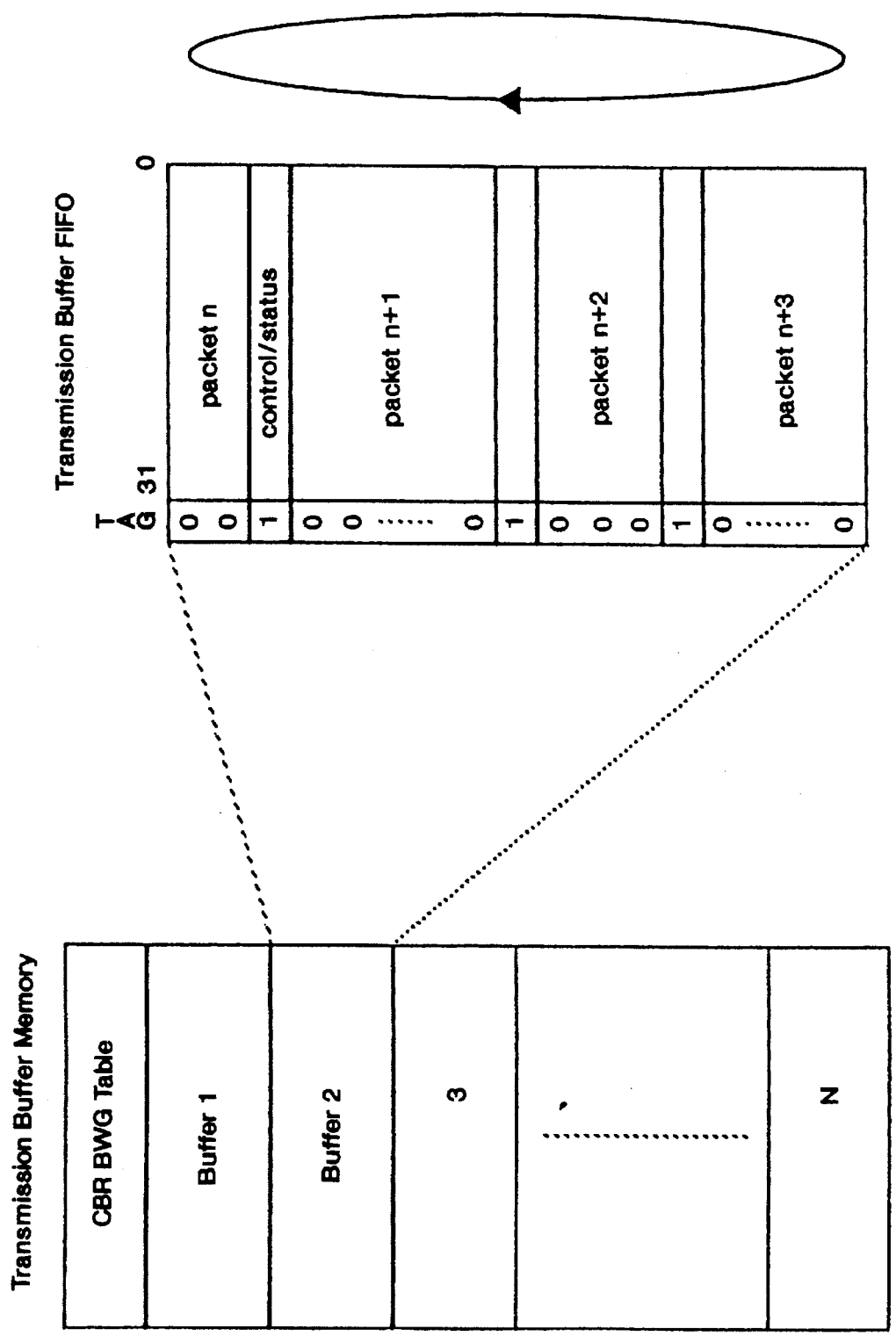
FIG. 6 is a memory map of the transmission buffer memory shown in FIG. 4.

FIG. 6 shows a memory map of the external transmission buffer memory 30, containing the bandwidth group (BWG) table for constant bit rate (CBR) channels, along with a plurality of memory blocks for the transmission FIFO buffers. As illustrated in FIG. 6, a particular FIFO buffer may contain more than one packet of data, identified by one or more tag bit. The FIFO buffer memory structure is described in greater detail herein below.

In the preferred form of the ATM NIC, the transmission buffer memory 30 comprises external 34 bit (including two tag bits) SSRAM, supporting burst transfers operating at 40 MHz. The transmission buffer memory has a bandwidth of 1.2-Gbps, of which half of the bandwidth is used for system packet traffic (from the load engine) and the other half for media 48 byte payload cell traffic (from the unload engine). The majority of traffic pattern over the memory will be in bursts to obtain maximum efficiency of the bandwidth. The reason to combine together as many of the same type of cycles (reads or writes) as possible is because bandwidth is wasted each time a switch is made between reading and writing. Time is physically needed to turn around the data bus servicing the transmission buffer memory when switching between reading and writing. If a read is immediately followed by a write, there is a possibility that the device writing to the RAM will be driving the data bus at the same time as the RAM itself for a transitionary period. The problem similarly arises for a write followed by a read. Thus, in order to overcome this difficulty, the reading and writing of data in the transmission buffer memory is performed in bursts, typically 48-byte cell payload amounts on the unload side and 64-byte amounts on the load side, with an enforced 1 clock cycle delay interposed in between. The 1 clock cycle dead period between reading and writing in the transmission buffer memory ensures that physical contention for the data bus does not occur, while the burst reads and writes maintain the high access bandwidth required of the buffer memory.

For a 622 Mbps transmission rate and a 40 MHz operating frequency, a cell transmission period of 27 clock cycles is required in order to transmit a single 53-byte ATM cell. In the preferred embodiment, each cell transmission period is divided between the load and unload engines. The unload engine requires twelve clock cycles to retrieve a 48-byte ATM cell payload, in twelve read cycles of one four-byte word per cycle. The remaining time in the cell transmission period is allocated to the load engine, allowing for a dead clock cycle between the bursts of read and write cycles. For example, with twelve read cycles by the unload engine, sufficient time remains for twelve write cycles by the load engine, together with a dead cycle between the burst of read cycles and the burst of write cycles and another dead cycle between the burst of write cycle and the read cycle burst for the next cell transmission period.

The DMA controller 50 of the load engine for the transmission buffer memory 30 has DMA cycles controlled by way of the schedule queue 72 which is contained in the internal control RAM 70 of the NIC. The schedule queue comprises a list of channel designations corresponding to FIFO buffers in the transmission buffer memory which require more data. During a DMA cycle the DMA controller reads the channel designation in the schedule queue. The channel designation points to a location in the internal control RAM which contains an address for a Tx data descriptor ring in the host computer system memory by which data for the particular FIFO buffer can be retrieved. The DMA controller accesses the data descriptor ring and uses the information contained therein to move the actual data packet in host computer memory to the appropriate FIFO buffer. At the end of data transfer a Tx completion ring is updated to instruct the host computer that the packet has been read.

The host computer coupled to the NIC deals with the descriptor ring data structures held in the host computer memory to post packets and receive status of transmitted packets. There is a data descriptor ring for each DMA channel (i.e. for each FIFO buffer). To post a packet the host computer builds a data structure filled with information about that packet. This information includes location of the actual data, how much data, whether it is a TCP packet, whether there is more than one data descriptor that describes this packet. After the descriptor ring data structure has been assembled the host computer writes the location of the data structure within the ring of data structures to a 'kick register' within transmission load engine of the NIC. The load engine then reads the descriptor ring data structure and begins to DMA the packet data into the FIFO buffer memory. Once all the data has been moved into the FIFO buffer, the load engine writes to the Tx completion ring, which contains a ring of data structures that indicate which packet was transmitted.

There are multiple transmit data descriptor rings, each associated with a pre-programmed bandwidth group. In the preferred embodiment of the NIC, there can be up to 8 rings each being subscribed to a separate VBR leaky bucket, or up to 120 rings for CBR services. Each descriptor ring will have one or more packets queued for transmission. The allocated bandwidth group for the corresponding descriptor ring is shared among packets waiting to be transmitted. Each descriptor in the ring holds information on a data buffer region in the host computer memory. Each packet can consists of one or more host computer memory data buffers which would mean one or more descriptors. The host computer software does a 'kick' to the NIC hardware every time it posts a packet to the ring. The kick is an I/O command having a parameter indicative of the Tx data ring number (0–126), and the corresponding descriptor number that the software has touched last. The hardware internally keeps track of the last descriptor, per ring, it has processed. When both hardware and software descriptor pointer match, it is an indication that the corresponding ring (channel) has ran out of data. Under this condition, the corresponding channel goes to sleep until it is waken up again by a software kick command. This mechanism prevents hardware from polling descriptor rings when there is no data to send. A similar mechanism is used for completion ring, wherein the software kicks the NIC hardware every time an available descriptor is posted to the completion ring. The hardware will not poll the host computer memory for a completion ring descriptor unless there is an available descriptor.

As described above, the external transmission data buffer memory 30 is segmented to multiple FIFO buffers 52 for outgoing packets. The transmission buffer memory can be segmented up to 127 buffers, of which the first 8 (buffer numbers 0 to 7) are allocated for VBR connections and buffers 8–126 for CBR channels. Each channel's FIFO buffer size can be programmed in a multiple of $2k \times 2^n$ (n=1–7) bytes. Each FIFO buffer corresponds to one transmit channel. Depending on the individual FIFO buffer size, there can be one or more packets in flight in each FIFO buffer. The multiple packet per FIFO buffer functionality is achieved via a tag bit for the transmission buffer memory. The transmission buffer memory, in one form of the invention, is 34 bits wide, of which two bits are used as a tags.

Packet data is moved from the host computer memory to the transmission buffer memory by the load engine. There are three types of packets that may be moved from host memory according to the preferred embodiment of the ATM NIC. The type of packets are AAL5 without MPEG packetization, AAL5 with MPEG packetization and non-AAL5. The type of packet is determined by the data descriptor. As soon as a portion of the packet data is moved into the transmission buffer memory it may be moved out by the unload engine to be segmented into cells. An exception is TCP packets which are fully buffered in the transmission buffer memory before transmission in order to generate a TCP checksum value and stuff it into the TCP header before segmentation. Multiple packets may be held in a particular FIFO buffer at any given time. Each packet in the FIFO buffer memory is preceded by a header containing information the unload engine will need in order to segment the packet to form ATM cells.

There is a class of applications which will transmit large sequences of very small packets, where each small packet is the same length. An example of this is MPEG video over ATM, which may package 1 or 2 MPEG frames (188 or 376 bytes, respectively) in an AAL5 packet. The software overhead of placing each of these tiny packets on the Tx descriptor ring and claiming from the Tx completion ring would be unnecessarily wasteful of processing power. Thus the NIC provides a feature to take a single Tx descriptor which points to a large block of host memory, segment this buffer into a large number of small AAL5 packets, and return the entire buffer as a single entry on the Tx completion ring.

Figure 7:
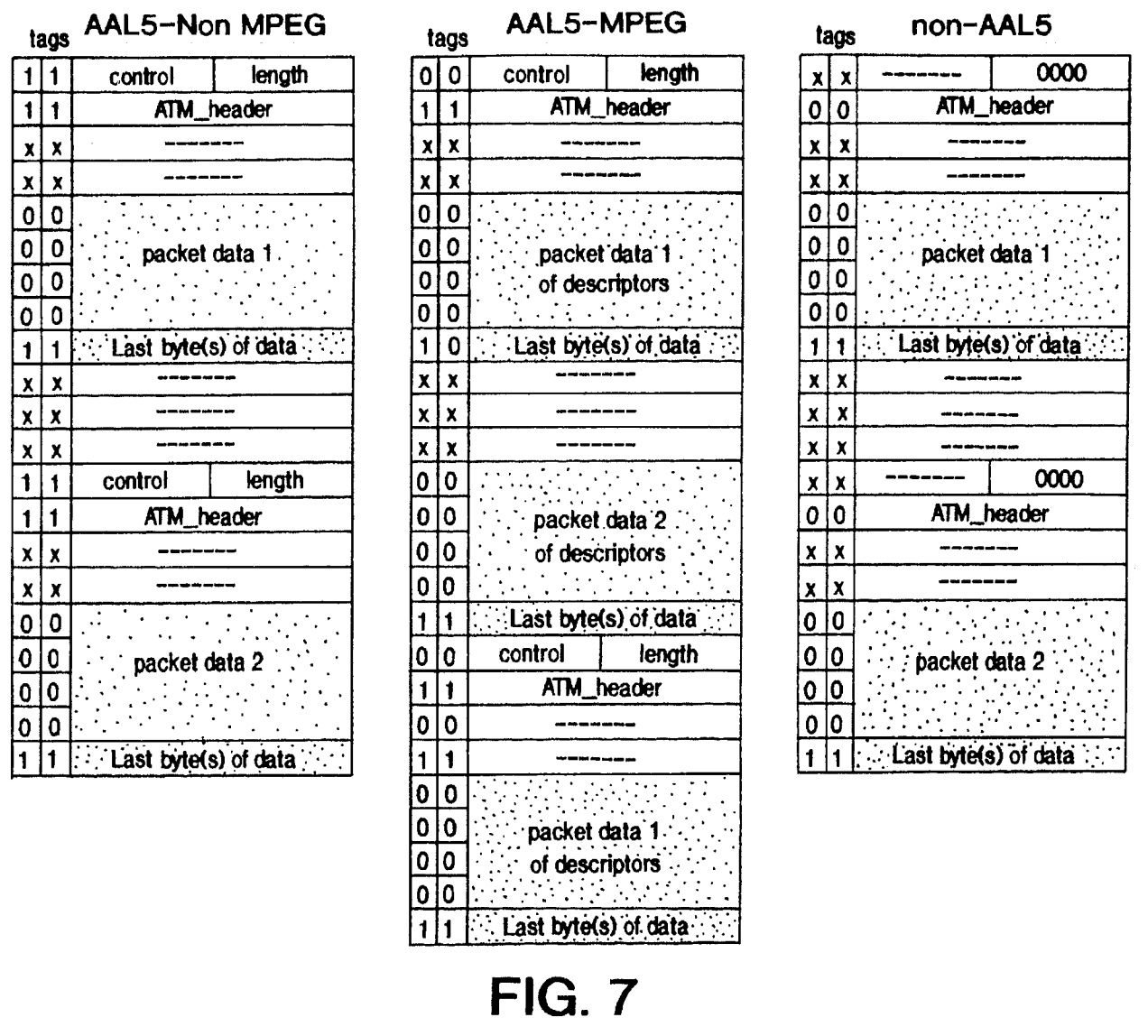

In the transmission buffer memory, the different types of packets are identifiable by the tag bits associated with the beginning and end of the packets stored therein, as shown in FIG. 7. For non-MPEG AAL5 packets the header tag bits are set to "1" for the first two words. The first word contains AAL5 control and length fields. The second word contains the ATM header field. The header is then followed by two empty words and the data section begins. The data end is indicated by either of the tag bits being set to a "1".

In the case of an MPEG AAL5 block of data, the data is first packetized before being segmented into cells by the unload engine. The format of the transmission buffer memory must therefore provide information concerning the packet boundaries to the unload engine. In MPEG AAL5 packets the header tag bits are set to "0" for the first word and a "1" for the second word (FIG. 7). The rest of the header is the same as the non-MPEG AAL5 packet. The data field also starts at the fifth word from the beginning, like the non-MPEG packet. The packet ends with one tag bit set to "1" and one tag bit set to "0". But, unlike the non-MPEG packet, a new header does not follow. The unload engine senses from the tag bits that the transmission buffer contains MPEG AAL5 data, and utilizes the previous header to create cells for this packet. The previous header will be reused until both tag bits are set to a "1", indicating the end of the MPEG data block. When both tag bits are set to a "1" a new AAL5 header precedes the following data packet data field.

For non-AAL5 packets, the header tag bits of the first word are a "don't care" ("x") value, and the tag bits corresponding to the second word are set to a "0". The first word is not used but the length field is set to zero. The second word comprises the ATM header, as in the AAL5 packets. Data follows on the fifth word and ends when either tag bit is set to a "1". In practice it is preferable that the actual data size be a multiple of 48 bytes.

The segmentation of cells is done by the unload engine. According to an entry in the bandwidth group table, the unload engine reads out enough data from a particular transmission FIFO buffer to build an ATM cell. In addition to retrieving the ATM cell payload from the FIFO buffer, the unload engine also reads packet information from the Tx control RAM, inserts the ATM header, pads cells with null data when necessary, and add CRC and length fields at the end of AAL5 type packets. At each cell opportunity time if the FIFO buffer for that channel is sufficiently empty, the unload engine also schedules a DMA cycle by making an entry in the schedule queue in the control RAM.

Figure 8:
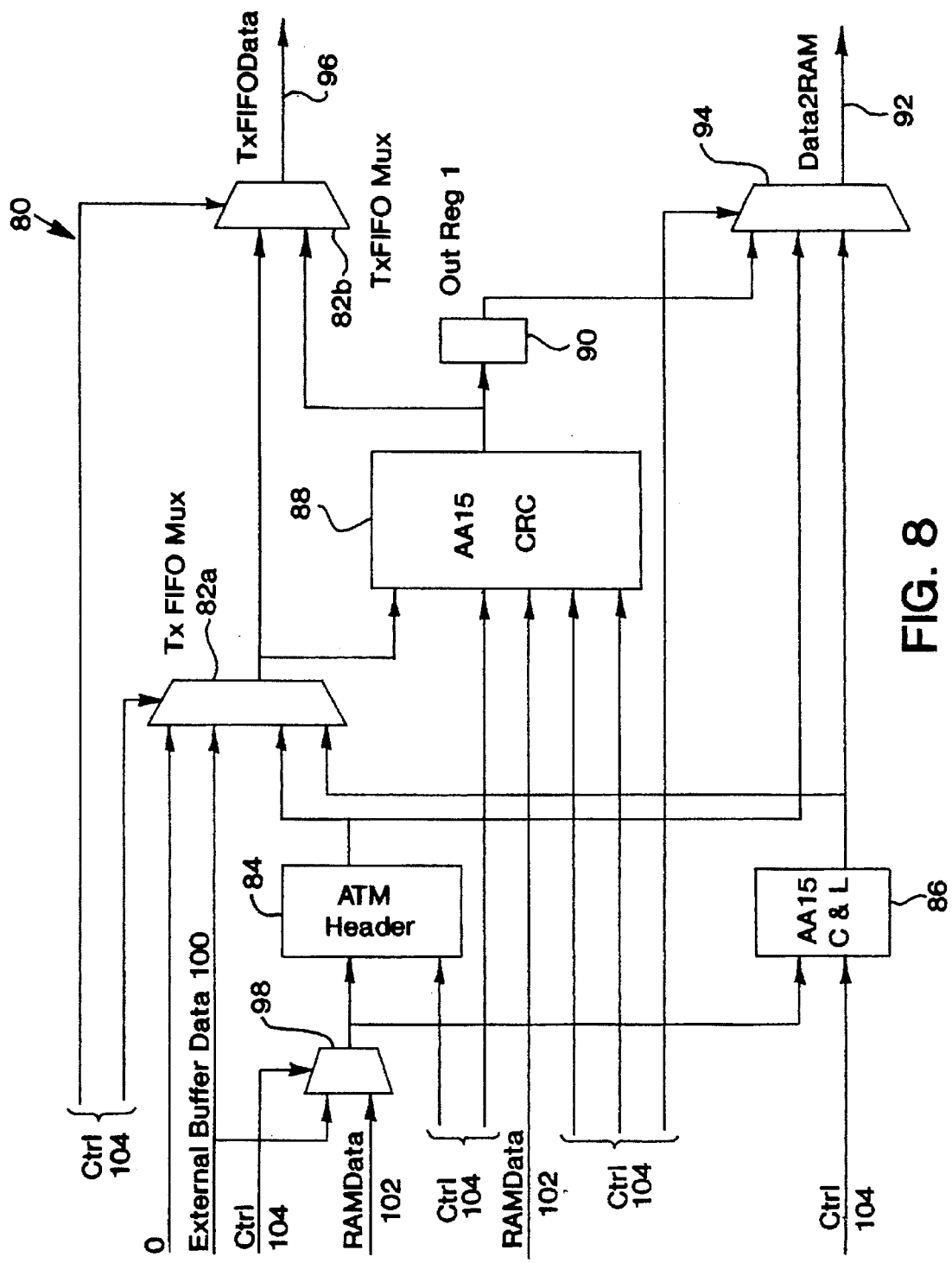
FIG. 8 is a block diagram of components of an unload engine forming an unload data path.

Components forming an unload data path portion 80 of the unload engine 24 are shown in the block diagram of FIG. 8, comprising Tx FIFO data MUX 82a,82b, an ATM header register 84, an AAL5 control and length register 86, an AAL5 CRC circuit 88, an output register 90, an input MUX 98, and an output MUX 94. Cell payload data retrieved from the FIFO buffer memory 30 is input to the Tx FIFO MUX 82a and input MUX 98. The Tx FIFO MUX 82a also receives input from the output of the ATM header register 84 and the AAL5 control and length register 86 as well as a "0" input. The output of Tx FIFO MUX 82a is coupled to the Tx FIFO MUX 82b, and is coupled to the AAL5 CRC circuit which also passes output to the Tx FIFO MUX 82b. The output 96 of the Tx FIFO MUX passes Tx FIFO data to the Tx FIFO 62 (FIG. 2) for transmission on the ATM network.

Data from the control RAM is coupled to the input MUX 98 and AAL5 CRC circuit, so that the DMA state data for the particular channel being serviced can be accessed, such as the ATM header, the AAL5 control and length data and AAL5 CRC value. The ATM header data and AAL5 control and length data from the control RAM is passed from the input MUX 98 to the ATM header register 84 and AAL5 control and length register 86, respectively. The partial AAL5 CRC value from the control RAM is passed to the AAL5 CRC circuit, which adds the data passed to the Tx FIFO into the CRC. The output MUX 94 has an output 92 coupled to pass data back to the control RAM. The output MUX 94 has inputs coupled to the ATM header register, the AAL5 control and length register, and the AAL5 CRC circuit by way of the output register 90.

The unload data path 80 of the unload engine is controlled by an unload state machine (not shown), which receives input from the BWG table (for CBR channels) and the leaky bucket mechanism (for VBR channels) and controls the unload data path using control lines 104. The unload state machine begins by looking at its two sets of inputs. A CBR request is always serviced before a VBR request. The segmentation begins by reading the DMA state for the channel from the control RAM, and writing the state data to the unload data path components. Once all the DMA state information is written, the unload state machine controls the unload data path to begin reading data from the external FIFO buffer memory. While waiting for the segmentation to complete, the unload state machine looks to see if there is enough room in the channel FIFO buffer to schedule a DMA cycle. If there is enough room and the channel is not already scheduled, the channel number is written to the schedule queue.

The segmentation is performed by the unload data path 80. The Tx FIFO data bus 96 is used to pass either data from a FIFO buffer 52, the ATM header register 84, the AAL5 control and length register 86, the AAL5 CRC circuit 88 or a zero field to the Tx FIFO by way of the Tx FIFO MUX 82a,82b. The ATM header register and AAL5 control and length register are initially loaded from the FIFO buffer on input line 100 through the input MUX 98 at the first cell segmented from a packet. Thereafter, for the remainder of the packet, these registers are loaded through the input MUX from the control RAM on line 102. The AAL5 CRC is calculated by the CRC circuit 88 from data written to the Tx FIFO from the output of Tx FIFO MUX 82a, and the resulting CRC is fed to the Tx FIFO by way of Tx FIFO MUX 82b. The output register 90 is used at the time of the last write to the Tx FIFO to store the AAL5 CRC word, and the output MUX 94 is used to pass DMA state data back to the control RAM from the output register 90, the ATM header register 84 and AAL5 control and length register 86, as required.

While the present invention has been described in conjunction with the above embodiment, it is evident that numerous alternatives, depictions, variations and uses will be apparent to those skilled in the art in light of the foregoing description. Accordingly, the detailed description of the present invention herein above has been presented by way of example only, and it is to be understood that the scope of the present invention and the features essential thereto is defined in the appended claims which are not to be unnecessarily limited by reference to the foregoing description of the preferred embodiments.

What is claimed is:

1. A data buffer for buffering data to be transmitted from a computer system by way of a telecommunications connection comprising a plurality of communication channels to a plurality of respective telecommunications endpoints, the data buffer comprising:

a plurality of FIFO memories corresponding to said plurality of communication channels;

a load engine circuit coupled to said computer system and said plurality of FIFO memories for retrieving data from said computer system and storing the retrieved data in a first selected one of said plurality of FIFO memories according to a load queue; and an unload engine circuit coupled to said plurality of FIFO memories for retrieving data from a second selected one of said plurality of FIFO memories according to an unload queue for transmission on a said communication channel corresponding to said second selected FIFO memory.

2. A data buffer as claimed in claim 1, wherein each said FIFO memory is associated with a data threshold, and wherein said unload engine circuit includes a computational circuit for determining an amount of data in said second selected FIFO memory and comparing the determined amount of data with the data threshold for second selected FIFO memory, said unload engine being coupled to said load queue so as to enter said second selected FIFO memory in said load queue if said determined amount of data does not exceed said data threshold for said second selected FIFO memory.

3. A data buffer as claimed in claim 1, wherein the data retrieved from said computer system and stored in said first selected FIFO memory is in the form of a TCP data packet, and wherein each said FIFO memory is of a size large enough to store at least one TCP packet.

4. A data buffer as claimed in claim 3, wherein each said FIFO memory is associated with a respective write pointer for pointing to a location in that FIFO memory for the load engine circuit to begin storing data at, a read pointer for pointing a location in that FIFO memory for the unload engine circuit to begin retrieving data from, and a packet header pointer for pointing to a location at which to stuff a checksum for the TCP packet in a header thereof.

5. A data buffer as claimed in claim 1, further comprising a control memory coupled to the load engine circuit and the unload engine circuit, the control memory containing said load queue, wherein said load queue is written to by said unload engine and read from by said load engine in order to select said first selected FIFO memory.

6. A data buffer as claimed in claim 5, wherein said control memory contains state data for each of said plurality of communication channels, the state data corresponding to said first selected FIFO memory being read from the control memory by the load engine in order to retrieve data from the computer system and store the retrieved data in said first selected FIFO memory.

7. A data buffer as claimed in claim 6, wherein said state data corresponding to said second selected FIFO memory is read from said control memory by the unload engine, said state data including a cell header for data to be transmitted from said second selected FIFO memory on a corresponding communication channel.

8. A data buffer as claimed in claim 1, wherein said telecommunications connection comprises a connection to an asynchronous transfer mode (ATM) network, and said plurality of communications channels comprise virtual channels in said ATM network.

9. A data buffer as claimed in claim 8, wherein the data retrieved from said computer system and stored in said first selected FIFO memory comprises at least one transmission control protocol (TCP) data packet.

10. A data buffer as claimed in claim 8, wherein the data retrieved from said second selected FIFO memory comprises at least one 48-byte ATM cell payload.

11. A data buffer as claimed in claim 1, further comprising a transmit FIFO coupled to said unload engine for buffering data retrieved from said second selected FIFO memory for transmission.

12. A data buffer as claimed in claim 1, wherein the storing of data in said first selected FIFO memory by said load engine and the retrieving of data from said second selected FIFO memory by said unload engine is performed in bursts of write and read cycles, respectively, with a dead cycle interposed between each burst of read and write cycles.

13. A data buffer as claimed in claim 12, wherein said burst of write cycles performed by load engine comprises consecutively writing twelve words of data into said first selected FIFO memory, and said burst of read cycles performed by said unload engine comprises consecutively reading twelve words of data from said second selected FIFO memory, wherein a said burst of read cycles is followed by a said dead cycle, comprising a single clock cycle, and then followed by a said burst of write cycles, and wherein a said burst of write cycles is followed by a said dead cycle and then followed by a said burst of read cycles.

14. A data buffer as claimed in claim 1, wherein each said FIFO memory includes at least one tag bit for each memory word, said at least one tag bits for the memory words in said first selected FIFO memory being set by said load engine so as to indicate a data packet header and an end of packet for the data stored in said first selected FIFO memory.

15. A data buffer as claimed in claim 14, wherein packet header data is added to the data retrieved by said unload engine according to said tag bits in said second selected FIFO memory.

16. A data transmission interface for transmitting data from a host computer having a host memory to an asynchronous transfer mode (ATM) telecommunications network by way of an ATM connection, the ATM connection comprising a plurality of communication channels to a plurality of respective telecommunications endpoints in the ATM network, the data transmission interface comprising:

a transmission buffer memory comprising a plurality of FIFO buffers corresponding to said plurality of communication channels;

a load engine comprising a direct memory access (DMA) circuit coupled to said host computer by way of a bus interface and coupled to said transmission buffer memory, the DMA circuit being adapted to retrieve a data packet from said host memory in accordance with a channel designation in a load schedule, and store the retrieved packet data in the FIFO buffer corresponding to said channel designation;

an unload engine comprising a segmentation circuit coupled to said transmission buffer memory, for retrieving ATM cell payload data from a said FIFO buffer designated in an unload table, adding ATM cell header data to said payload data so as to form an ATM cell, and outputting said ATM cell; and a transmission FIFO pipeline buffer coupled to receive said ATM cell from said unload engine, and coupled to said ATM network by way of a network interface to pass the ATM cell to the ATM network.

17. A data transmission interface as claimed in claim 16, wherein each said FIFO buffer is associated with a data threshold, and wherein said unload engine circuit includes a computational circuit for determining an amount of data in said FIFO buffer corresponding to said channel designation and comparing the determined amount of data with the data threshold for that FIFO buffer, said unload engine being coupled to said load schedule so as to enter said FIFO buffer corresponding to said channel designation in said load schedule if said determined amount of data does not exceed said data threshold.

18. A data transmission interface as claimed in claim 17 wherein, for each ATM cell passed to said ATM network, said unload engine performs a sequence of consecutive read cycles so as to retrieve ATM cell payload data from a said FIFO buffer, and said load engine performs a sequence of consecutive write cycles so as to store a portion of a data packet in a said FIFO buffer, said sequence of consecutive read cycles and said sequence of consecutive write cycles being separated by a dead cycle.

19. A method for buffering data to be transmitted from a computer system by way of a telecommunications connection comprising a plurality of communication channels to a plurality of respective telecommunications endpoints, the method comprising:
    establishing a plurality of FIFO memories corresponding to said plurality of communication channels;
    consulting a load queue to determine a channel requiring data;
    retrieving data from said computer system and storing the retrieved data in a first selected one of said plurality of FIFO memories corresponding to said channel requiring data;
    consulting an unload queue to determine a channel for transmission;
    retrieving cell data from a second selected one of said plurality of FIFO memories corresponding to said channel for transmission; and
    transmitting said cell data on a said channel for transmission.

20. A method as claimed in claim 19, including the steps of:
    determining an amount of data in said second selected FIFO memory;
    comparing the determined amount of data with a threshold for the second selected FIFO memory; and
    entering said channel for transmission in said load queue on the basis of said comparison.

21. A method as claimed in claim 19, wherein said step of storing data in said first selected FIFO memory and said step of retrieving data from said second selected FIFO memory are performed for each transmission of cell data, said FIFO memories being accessed in bursts of consecutive read cycles and write cycles such that each burst of read cycles is separated from a burst of write cycles by at least one dead cycle.

22. A method as claimed in claim 19, wherein said cell data comprises an ATM cell payload of 48-bytes of data, and wherein said method includes the step of adding an ATM header to said cell data so as to form an ATM cell before transmitting said cell data on said channel for transmission.

23. A method as claimed in claim 19, wherein each said FIFO memory includes at least one tag bit for each memory word, said at least one tag bits for the memory words in said first selected FIFO memory being set so as to indicate a data packet header and an end of packet for the data stored in said first selected FIFO memory.

24. A method as claimed in claim 23, including the step of adding packet header data to said cell data according to said tag bits in said second selected FIFO memory.

25. A network for computer communication, comprising:
    an asynchronous transfer mode (ATM) network coupled to a plurality of communication endpoints by way of a plurality of corresponding channels;
    a host computer having packet data for transmission to said plurality of communication endpoints; and
    a transmission interface coupled from said host computer to said ATM network by way of a telecommunications connection for carrying signals for transmission on said plurality of channels, said transmission interface comprising:
        a transmission buffer memory comprising a plurality of FIFO buffers corresponding to said plurality of communication channels;
        a load engine comprising a direct memory access (DMA) circuit coupled to said host computer by way of a bus interface and coupled to said transmission buffer memory, the DMA circuit being adapted to retrieve a packet data from said host memory in accordance with a channel designation in a load schedule, and store the retrieved packet data in the FIFO buffer corresponding to said channel designation;
        an unload engine comprising a segmentation circuit coupled to said transmission buffer memory, for retrieving ATM cell payload data from a said FIFO buffer designated in an unload table, adding ATM cell header data to said payload data so as to form an ATM cell, and outputting said ATM cell; and
        a transmission FIFO pipeline buffer coupled to receive said ATM cell from said unload engine, and coupled to said ATM network by way of a network interface to pass the ATM cell to the ATM network.

26. A network as claimed in claim 25, wherein each of said plurality of FIFO buffers is of a size capable of storing a transmission control protocol (TCP) data packet, and wherein said unload engine retrieves said cell payload data in bursts of twelve consecutive read cycles of one four-byte word per cycle so as to retrieve a 48-byte ATM cell payload.

* * * * *